Figures 1, 2:
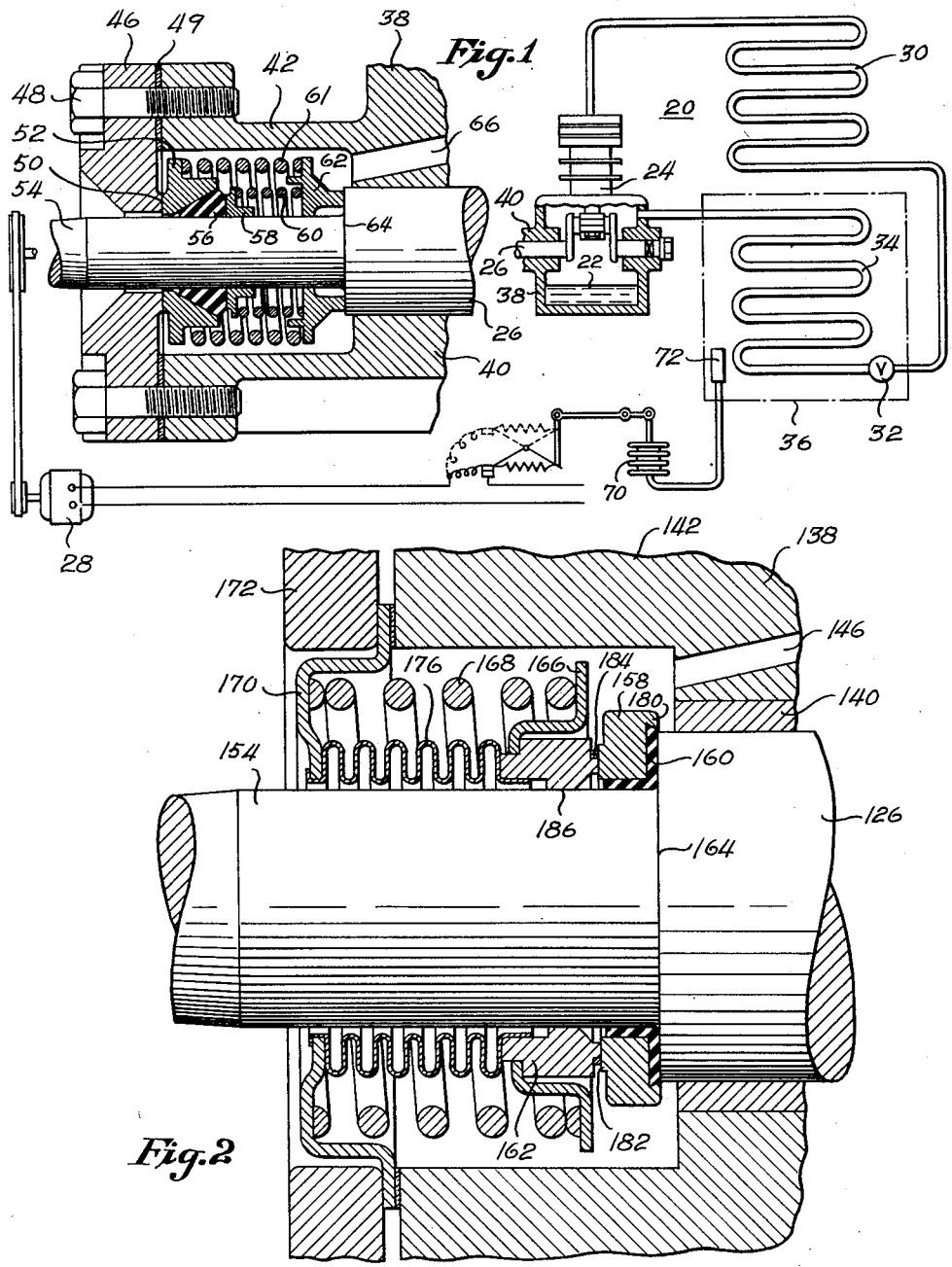

March 7, 1939.  A. A. McCORMACK  2,149,975

ELASTIC COMPOSITION

Filed Aug. 5, 1936

INVENTOR.
Alex A. McCormack
BY
Spencer Hardman and Fehr
ATTORNEYS

Patented Mar. 7, 1939

2,149,975

UNITED STATES PATENT OFFICE 2,149,975

ELASTIC COMPOSITION

Alex A. McCormack, Dayton, Ohio, assignor to General Motors Corporation, Dayton, Ohio, a corporation of Delaware Application August 5, 1936, Serial No. 94,421

3 Claims. (Cl. 260—27)

This invention relates to refrigerating apparatus and more particularly to a resilient elastic yielding material for acting as a seal between metal parts in a refrigerating system.

In refrigerating systems it is necessary at many points to provide a fluid-tight sealing means to prevent the escape of refrigerant and lubricant from the refrigerating system or from one part of the system to another. Yielding, elastic, resilient materials like rubber are well suited to make a seal between metal parts, but in the case of rubber the refrigerant and lubricant attack and deteriorate the rubber and in a relatively short time causes it to become unsatisfactory for most sealing purposes and permits the seal to leak after a period of time.

It has been proposed to use a polymer of chloro-2-butadiene-1,3 as a seal between metal parts of refrigerating systems in the place of rubber or other elastic materials which might be used. However, I find that ordinary compounds containing this polymer are not well suited for refrigerating systems because they tend to swell or increase in dimensions when in contact with the refrigerant and the lubricant in the refrigerating systems, and because they can disintegrate or partially dissolve in the presence of refrigerant and lubricant. This is particularly true when sulphur dioxide is used as a refrigerant, since it is almost impossible to obtain absolutely dry sulphur dioxide, and since any moisture within a sulphur dioxide system forms sulphurous acid which tends to attack materials within the system.

It is an object of my invention to provide a yielding, resilient, elastic, rubber-like material having satisfactory mechanical properties and containing no rubber which will satisfactorily and permanently provide a resilient elastic seal between metal parts of a refrigerating system.

It is a more specific object of my invention to provide an improved elastic rubber-like material having satisfactory mechanical properties and containing no rubber, which will satisfactorily and permanently provide a seal between metal parts of a refrigerating system containing sulphur dioxide and a lubricant.

Further objects and advantages of the present invention will be apparent from the following description, reference being had to the accompanying drawing, wherein a preferred form of the present invention is clearly shown.

In the drawing:

Fig. 1 is a view of a refrigerating system partly diagrammatic, illustrating one form of seal embodying my invention; and Fig. 2 is an enlarged sectional view of a shaft portion of a refrigerant compressor illustrating another seal embodying my invention.

Briefly, as a refrigerant seal between metal parts in a refrigerating system containing sulphur dioxide and a lubricant, I employ preferably a compound containing the following substances in part by weight:

| | |
|---|---|
| Polymer of chloro-2-butadiene-1,3 | 100 parts |
| Litharge | 50 parts |
| Zinc oxide | 2 parts |
| Abietic acid | 2½ parts |
| Lamp black (amorphus carbon) | 100 parts |
| Mineral oil | 5 parts |
| Sulphur | 1% of entire volume |

Referring now more particularly to the drawing, there is shown a refrigerating system, generally designated by the reference character 20, containing a refrigerant such as sulphur dioxide and a lubricant such as a mineral base refrigerator lubricating oil 22, shown in the bottom of the crankcase of a reciprocating compressor 24. The compressor 24 is driven through its drive shaft 26 by an electric motor 28 for compressing the refrigerant and for forwarding the compressed refrigerant to a condenser 30 where the compressed refrigerant is liquefied and forwarded under the control of a suitable automatic valve 32 to an evaporating means 34 located within an enclosure 36 containing a medium to be cooled. Within the evaporating means 34, the refrigerant evaporates under a reduced pressure and is returned to the crankcase of the compressor by return conduit means.

The operation of the electric motor and the refrigerating system is controlled by a snap acting thermostatic switch means 70 having a thermostat bulb 72 located within the enclosure 36 in the medium to be cooled. This switch is in series with the electric conductors which supply the energy to the electric motor 28 for operating the compressor.

The drive shaft of the compressor extends through the wall 38 of the compressor, which wall is provided with a bearing 40 for supporting one end of the drive shaft. This wall is also provided with a hollow boss 42 for receiving a shaft seal which prevents the escape of refrigerant and lubricant from the crankcase of the compressor through the opening provided for the drive shaft. This seal also prevents the ingress of air into the crankcase. This boss 42 is provided with an end plate 46 fastened to the base of the boss by screws 48. A soft metal gasket 49 is provided between the end plate 46 and the face of the boss 42 to hermetically seal the end plate 46 to the boss. Upon its inner face, the end plate 46 is provided with an annular sealing surface 50 with which the shaft seal cooperates to form a relatively rotating fluid-tight joint to prevent the escape of refrigerant and lubricant from the compressor and to prevent the ingress of air into the refrigerating system.

The shaft seal is provided with an annular sealing ring 52 which surrounds the reduced outer portion 54 of the drive shaft 26. The sealing ring 52 is preferably made of a smooth long wearing metal which is provided with a conical recess, which recess receives a wedge-shaped resilient elastic rubber-like ring 56 of a material hereinafter to be disclosed. This wedge-shaped, rubber-like sealing ring 56 is tightly wedged in between the sealing ring 52 and the reduced portion 54 of the drive shaft 26 so as to form a fluid-tight seal between the sealing ring 52 and the reduced portion 54 of the drive shaft 26. This is performed by a flanged ring 58 which surrounds the reduced portion 54 of the drive shaft 26 and presses against the exposed face of the wedge-shaped rubber-like sealing ring 56.

This ring 58 is pressed against the exposed face of the wedge-shaped rubber-like sealing ring 56 by an inner coil spring 60 which provides the force necessary for the flanged ring 58 to wedge the resilient elastic rubber-like ring tightly between the sealing ring 52 and the reduced portion of the drive shaft 26. The other end of the coil type compression spring 60 is held by another ring member 62 which presses against a shoulder 64 formed between the reduced portion 54 and the bearing portion of the drive shaft 26. A second compression type coil spring 61 is provided which extends between the ring member 62 and the sealing ring 52 to hold the sealing ring in sufficiently tight engagement with the annular sealing surface 50 upon the end plate 46.

The wedging of the rubber-like wedge-shaped ring between the sealing ring 52 and the reduced portion 54 of the drive shaft 26 causes the entire shaft seal to rotate with the shaft 26. This causes relative rotation between the sealing ring 52 and the sealing surface 50. In order to lubricate these relatively rotating sealing surfaces, I have provided a passage 66 for the lubricating oil for lubricating the interior of the boss containing the shaft seal. This provides under normal circumstances sufficient lubrication for the relatively rotating sealing surfaces.

While this passage is intended for oil, it also permits the free access of refrigerant to this space. It will thus be seen that the rubber-like wedge-shaped ring 56 is exposed to the action of both refrigerant and lubricant and under unfavorable conditions to moisture and acids which might form because of the presence of moisture in contact with the refrigerant in the refrigerating system. It is well known that rubber deteriorates in the presence of oil, and is also attacked by the ordinary refrigerants, particularly sulphur dioxide. I have also found that ordinary compounds of rubber substitutes also are unsatisfactory for such use in a refrigerating system, particularly when containing moist sulphur dioxide since most of these compounds are subject to considerable swelling, which is sufficient to distort the ring and prevent its proper action.

I have, therefore, provided an improved ring 56, made of a yielding elastic rubber-like composition which will meet the conditions required for this service. This composition contains no rubber and will withstand immersion in moist sulphur dioxide and oil or oil and other refrigerants at relatively high temperatures without disintegrating or increasing the dimensions more than 10% and without increasing the volume more than 20%. It is not materially attacked by moist sulphur dioxide, moisture, oil or other refrigerants such as methyl and ethyl chlorides, methylene chloride, or difluorodichloromethane or tetrafluorodichloroethane or other halides and halofluoro refrigerants. This material has a hardness of between 70 and 80 according to the shore scleroscope system of measurment. It is one of the varieties of compounds generally known as chloroprene and is compounded according to the following formula in parts by weight:

|  | Parts by weight | Percent by weight |
|---|---|---|
| Polymer of chloro-2-butadiene-1,3 | 100 parts | 38.2 |
| Litharge | 50 parts | 19.1 |
| Zinc oxide | 2 parts | .8 |
| Abietic acid | 2½ parts | .9 |
| Lamp black (amorphus carbon) | 100 parts | 38.2 |
| Refrigerator oil (mineral oil) | 5 parts | 1.9 |
| Sulphur | 1% | 1% |

These materials are mixed, milled on a hot mill, calendered to thickness, laid in molds and cured by pressure, heat and time. The formula, however, may be varied considerably without greatly changing the properties of the material. In fact, some of the materials may vary more than 5% without any material or great change in the properties of the product. Furthermore, several of these ingredients may be omitted or other materials substituted without any material change in properties. For example, the oil may be omitted and the sulphur, the abietic acid and the zinc oxide may also be omitted or other materials substituted. Principally, the abietic acid may be replaced by five to ten parts of wood rosin or other resins. Also, if desired, one or two parts of either phenyl-alpha-naphthylamine or phenyl-beta-naphthylamine.

I find that this elastic rubber-like material withstands the action of refrigerants, particularly moist sulphur dioxide, as well as lubricants, with the least amount of swelling and deterioration of any material of this type I am acquainted with. This material is also superior for use with halide and halofluoro refrigerants such as ethyl, methyl and methylene chlorides and difluorodichloromethane and tetrafluorodichloroethane. It is useful wherever it is desired to use a rubber-like or resilient sealing material between two other materials for resistance to deterioration by certain chemicals and lubricants and a minimum of swelling is important.

In Fig. 2 I have shown another form of seal embodying this same material. In this figure there is shown a fragmentary portion of a crankcase wall and boss similar to the enlarged portion of Fig. 1. This wall, generally designated by the reference character 138, is provided with a boss 142 having a bearing 140 which receives the bearing portion of a shaft 126 provided with an end portion 154 of reduced diameter, providing a shoulder 164 between the reduced portion and the bearing portion. The hollow boss is supplied with lubricant, and incidentally refrigerant, through the oil passage 146. Supported against the shoulder 164 of the shaft 126 is a nitralloy ring 158 which surrounds the reduced portion of the shaft 154. This nitralloy ring is nitrited and hardened.

This nitralloy ring is provided with a cut-back flange portion 180 which has an inner diameter a few thousandths larger than the bearing portion of the drive shaft 126. Within the flanged portion 180 the adjacent face of the nitrited ring is recessed sufficiently to receive the radial portion of the elastic resilient rubber-like gasket ring 160. Thus, the radial portion of the gasket ring is confined by the flange 180, the shoulder 164 of the drive shaft 122 and the recessed face portion of the nitroalloy ring 158. The rubber-like gasket ring 160 is also provided with a portion which extends along the reduced portion 154 of the drive shaft in a direction away from the shoulder 164 so that it is held tightly between the inner periphery of the nitralloy ring 158 and the reduced portion 154 of the drive shaft 126.

This rubber-like gasket ring 160 is preferably of the same composition and is made in the same manner as the wedge-shaped ring 56 shown and described in connection with Fig. 1, and is similarly subject to modification.

Upon the opposite face of the nitralloy ring 158 there is provided a flat hard smooth sealing face 182. A seal ring 162 is held pressed against this sealing face 182 by a compression type coil spring 168 which extends between the end plate 170 and a flange 166 sealed to and surrounding the sealing ring 162. A flexible metal bellows 176 forms a flexible sealed connection between the end plate 170 and the sealing ring 162. The end plate 170 is clamped in tight sealing engagement with the face of the boss 142 by a clamping ring 172 and cap screws which thread into the boss.

The shaft seal serves to separate the refrigerant and lubricant within the compressor and the hollow boss 142 from the air without the compressor. Inasmuch as the compressor is driven by an electric motor as is the case in Fig. 1, it is necessary to provide relatively rotating sealing surfaces, one of which turns with the driving shaft and the other of which remains stationary. In this modification the rotating sealing surface is the face of the nitralloy ring 158 while the relatively stationary, though axially movable sealing surface or sealing face is provided by the sealing ring 162. Thus, there is relative rotation between the sealing face 182 of the nitralloy ring 158 and the sealing face of the sealing ring 162.

In the same manner as the remaining portions of the shaft seal, these relatively rotating sealing faces are exposed on one side to refrigerant and lubricant and on the other side to atmospheric air. These sealing faces are kept tightly together by the coil spring 168 so that refrigerant and lubricant, as well as air, are prevented from passing from one side to the other. This also prevents the proper lubrication of the entire face of the sealing ring. However, the edge of the sealing face which is exposed to the refrigerant and lubricant does obtain more lubrication. It, however, is also exposed to the refrigerant which along with the lubricant enters the hollow boss through the lubricant passage at 46.

Heretofore, as far as I am aware, sealing rings have had their faces made of not more than one metal. I have failed to find a single metal which will satisfactorily provide the best results and the longest life under such conditions, especially when a refrigerant such as sulphur dioxide is used, which seems to form very objectionable corrosion products upon the exposed edge of the bronze sealing faces. I find that bronze under the conditions of poor lubrication such as are present here, does not withstand the corrosion sufficiently well. I also find that other metals which are more satisfactory from the corrosion standpoint, are unable to withstand wear to a sufficiently satisfactory degree under the poor lubricating conditions found in the portion of the sealing face which is remote from lubrication.

Therefore, I have evolved a compound sealing face formed of two different metals. The outer portion of this compound sealing face is formed of tin or a high tin alloy which requires good lubrication to withstand wear but which does not corrode rapidly or form any very objectionable corrosion products. Inasmuch as this tin or tin alloy is placed upon the edge of the sealing face which is exposed to the lubricant it does receive sufficiently good lubrication. This sealing face of tin or tin alloy is formed upon the face of a ring 184 of tin or a high tin alloy which is provided upon the face of the seal ring 162. Preferably, the tin alloy has more than 90% tin and may be alloyed with antimony or other metals commonly alloyed with tin. Instead of tin and tin alloy, other low melting corrosion resisting alloys such as lead, zinc and their alloys may be used.

Within the sealing face 184 of tin or tin alloy is the sealing face 186 provided by the projection of a portion of the main body of the sealing ring 162. This main body of the sealing ring 162 as well as this projecting portion is preferably of a good wearing bronze, such as a leaded bronze of a suitable composition for resisting wear, such as one containing 69% to 71% copper, 20% to 22% lead and 8½% to 9½% tin. This sealing face 186 is exposed to air upon the one side and protected from corrosion on the other side by the sealing face of tin or tin alloy which separates the leaded bronze sealing face 186 from the refrigerant and lubricant. While the sealing face 186 receives very little lubrication, if any, it wears so well even under such conditions, that this condition is not objectionable. The corrosion of the other portions of the seal, other than the sealing face, is not sufficiently great as to be materially objectionable.

While the form of embodiment of the invention as herein disclosed, constitutes a preferred form, it is to be understood that other forms might be adopted, all coming within the scope of the claims which follow.

What is claimed is as follows:

1. A refrigerant seal for refrigerating systems comprising an elastic composition having ingredients in about the following proportion by weight:

|  | Parts by weight |
|---|---|
| Polymer of chloro-2-butadiene-1,3 | 100 |
| Litharge | 50 |
| Zinc oxide | 2 |
| Abietic acid | 2½ |
| Carbon | 100 |
| Mineral oil | 5 |
| Sulphur | 1% of entire volume |

2. An elastic composition for exposure to moist sulphur dioxide having ingredients in about the following proportions by weight:

| | Per cent |
|---|---|
| Polymer of chloro-2-butadiene-1,3 | 38.2 |
| Litharge | 19.1 |
| Zinc oxide | 0.8 |
| Abietic acid | 0.9 |
| Carbon | 38.2 |
| Mineral oil | 1.9 |
| Sulphur | 1% of entire volume |

3. An elastic composition of ingredients in about the following proportions by weight:

| | Per cent |
|---|---|
| Polymer of chloro-2-butadiene-1,3 | 38.2 |
| Litharge | 19.1 |
| Zinc oxide | 0.8 |
| Resin | 1.9 |
| Carbon | 38.2 |
| Mineral oil | 1.9 |
| Sulphur | 1% of entire volume |

ALEX A. McCORMACK.